United States Patent [19]

Schreiber et al.

[11] Patent Number: 4,901,082
[45] Date of Patent: Feb. 13, 1990

[54] ADAPTIVE WAVEFORM RADAR

[75] Inventors: Heinz H. Schreiber, Centerport; Martin G. O'Connor, Massapequa, both of N.Y.

[73] Assignee: Grumman Aerospace Corporation, Bethpage, N.Y.

[21] Appl. No.: 272,374

[22] Filed: Nov. 17, 1988

[51] Int. Cl.⁴ ............................................. G01S 7/34
[52] U.S. Cl. ................................... 342/89; 342/162; 342/196; 342/192
[58] Field of Search ............... 342/89, 159, 160, 195, 342/196, 16, 13

[56] References Cited

U.S. PATENT DOCUMENTS

| | | |
|---|---|---|
| 2,881,321 | 4/1959 | Dauksher et al. . |
| 3,039,092 | 6/1962 | Rychlik . |
| 3,044,060 | 7/1962 | Varela . |
| 3,050,726 | 8/1962 | Laurent . |
| 3,325,736 | 6/1967 | Waetjen . |
| 3,618,094 | 10/1969 | Ward . |
| 3,680,105 | 7/1972 | Goldstone . |
| 4,003,054 | 1/1977 | Goldstone . |
| 4,137,532 | 1/1979 | Taylor, Jr. et al. . |
| 4,204,211 | 5/1980 | Cavelos . |
| 4,207,624 | 6/1980 | Dentino et al. . |
| 4,218,678 | 8/1980 | Fowler et al. . |
| 4,237,461 | 12/1980 | Cantrell et al. . |
| 4,317,221 | 2/1982 | Toya . |
| 4,408,332 | 10/1983 | Sari . |
| 4,476,575 | 10/1984 | Franke et al. . |
| 4,568,938 | 2/1986 | Ubriaco . |
| 4,578,676 | 3/1986 | Harrison, Jr. . |
| 4,608,569 | 8/1986 | Dickey, Jr. et al. ............... 342/384 |
| 4,736,460 | 4/1988 | Rilling ............................ 342/380 X |
| 4,752,969 | 6/1988 | Rilling ............................ 342/380 X |

FOREIGN PATENT DOCUMENTS 2494855 11/1980 France .

Primary Examiner—Nelson Moskowitz
Assistant Examiner—John B. Sotomayor
Attorney, Agent, or Firm—Pollock, VandeSande & Priddy

[57] ABSTRACT

Prior art radar systems do not adapt the transmitted signal to avoid the interference bands but only filter the unadaptive receiver signal to eliminate the interference with resulting loss in detectability and distortion that in turn causes loss in resolution and increased ambiguity. The present invention allows a radar system to operate in an electromagnetic environment where co-channel narrow band interference is present, without loss of detectability, resolution and ambiguity. The present invention system adapts the radar transmitted signal so that its spectral energy is significant only in the interference free portions of the radar channel. It next adapts the receiver to detect this transmitted spectrum and then equalizes the signal by means of transversal equalizer coefficients to reduce distortions to the signal sidelobes.

20 Claims, 11 Drawing Sheets

TABLE 1

SIMULATION RESULTS (NO INTERFERENCE)

| | XMTTR | RCVR | ML/SL | PW | MISMATCH LOSS |
|---|---|---|---|---|---|
| OPTIMUM | LFM | MATCHED FILTER | 13.6 dB | .6 μS | .1 dB |
| | LFM | COS²/CONJ PHASE | 34 dB | 1.0 μS | 2.3 dB |
| | NLFM | COS²/CONJ PHASE | 44 dB | 1.2 μS | 0.2 dB |

FIG 7

TABLE 2

SIMULATION RESULTS (INTERFERENCE)

| NOTCH | ML/SL | PW | MISMATCH LOSS |
|---|---|---|---|
| NONE | 13.6 dB | .6 μS | .1 dB |
| -400 KHz | 19.0 dB | 1.1 μS | 2.9 dB |
| 0 KHz | 12.0 dB | .9 μS | 2.7 dB |
| -400, +300 KHz | 10.0 dB | .8 μS | 3.6 dB |

FIG 8

TABLE 3

SIMULATION RESULTS (INTERFERENCE)

REAL TIME FFT/ADAPTIVE WAVEFORM

| NOTCH | ML/SL | PW | MISMATCH LOSS |
|---|---|---|---|
| NONE | 44 dB | 1.2 μS | .2 dB |
| -400KHz | 22 dB | 1.4 μS | .5 dB |
| 0 KHz | 11 dB | 1.0 μS | .6 dB |
| -400,+300KHz | 9.5 dB | 1.3 μS | .7 dB |

FIG 9

ADAPTIVE WAVEFORM RADAR

FIELD OF THE INVENTION

The present invention relates to radar systems and more particularly to a technique and apparatus for operating radar and narrow band communications-type emitters in the same frequency band such that the radar transmitter and receiver maintain good signal detectability, optimized resolution and non-ambiguous performance.

BACKGROUND OF THE INVENTION

It is well known by those versed in the art of radar pulse waveform design that radar target resolution is inversely related to radar waveform bandwidth. It is also well known that the optimum theoretical detection performance of any radar system is dependent only upon the pulse waveform energy and the receiver noise configuration. In an effort to increase waveform energy using peak power limited radar transmitters, long pulse duration, constant envelope and wide bandwidth signals are used. These efforts are covered by the general category of large time-bandwidth product or pulse compression waveforms and are disclosed by the following references: Huttman German Patent Ser. No. 768,068; Cauer German Pat. No. 892,772; Sproule, et al. British Patent Ser. No. 604,429; Dicke U.S. Pat. No. 2,624,876; and Darlington U.S. Pat. No. 2,678,997.

In general, the long duration, high energy radar pulse in the above-mentioned systems is phase (or frequency) modulated (or coded) to realize a bandwidth that is orders of magnitude greater than that predicted by its pulse width alone. And it is this phase (or frequency) modulation (or code) that must be removed by a receiver of the system when its received echoes are processed. To do so, the received long duration pulse is compressed by the receiver into a narrow, high amplitude pulse. In most existing systems, this compression is performed in a fixed analog dispersive delay line. However, in accordance with copending application Ser. No. 196,579 entitled "FM Modulation Technique for Producing Frequency Rejection Bands" by Cermignani, et al., and also copending application Ser. No. 196,578 entitled "Narrow Band Interference Suppressor for Pulse Compression Radar," by Schreiber, et al., both applications having been assigned to the same assignee as the instant invention, it may presently be performed digitally, using a real time programmable discrete Fourier transform/inverse Fourier transform device. The discrete Fourier transform of the received time waveform is taken in real time, conjugate phase weighted to cancel the phase modulation (or code), amplitude weighted to control temporal sidelobes or ambiguity, and then transformed back into the time domain.

There exists, however, electromagnetic environments under which such radar systems must operate where narrow bandwidth, high-power interference sources are active at frequencies within the same bandwidth as that of the pulse compression radar. If, as presently done, the combination of the received interference and the desired, small echo signal is processed by an analog dispersive delay line, the resulting compressed time pulse may become distorted and undetectable, due to the presence of the much larger interference.

One approach to correct this problem is to design and implement narrow, fixed bandwidth, band eliminate filters in the radar receiver, prior to pulse recompression, so that the unwanted interference frequencies are attenuated prior to passing the received echo signal through the dispersive delay line. Yet because the interference changes its center frequency and bandwidth as a function of time and radar antenna azimuth angle, the narrow band eliminate filters must track the interference. Consequently, the radar must perform a spectral analysis of the environment; that is, precisely locating the interference emitters in the radar band of operation and tuning the band eliminate filters to the undesired emitter center frequency.

In practice, however, since the narrow, fixed bandwidth, band eliminate filters would attenuate, besides the interference and noise, the signal itself, there is a significant net loss in the signal-to-noise ratio, especially if multiple narrow band cancellers are needed to remove multiple in-band interferences. As is well known in the signal processing art, this result follows directly from the fact that the resulting receiver transfer function is not the "matched filter" for the transmitted signal; hence, there is the degradation in post-detection signal-to-noise ratio caused by the mismatch filter loss.

Degradation in post-detection signal-to-noise ratio notwithstanding, the narrowed, fixed bandwidth, band eliminate filters also introduced intolerable increases in the compressed pulse temporal sidelobes. As is well known in the signal analysis art, this increase in the compressed pulse temporal sidelobes follows directly from the fact that receiver transfer function causes "paired echo" distortion of the recompressed pulse, i.e., the amplitudes of the paired echoes are proportional to the relative bandwidth of the band eliminate filters, and their locations relative to the main pulse of the signal are determined by their displacement from the center frequency of the original signal. Oftentimes this degradation of main lobe to sidelobe ratio is referred to as ambiguity, since there would appear to be many targets when in fact there is only one. Thus, present systems do not adapt the transmitted signals to avoid the interference bands but only filter the unadapted receiver signal to eliminate the interference, with resulting loss in detectability and distortion that causes loss of resolution and increases ambiguity.

BRIEF DESCRIPTION OF THE INVENTION

The present invention is a technique and the apparatus thereof for restoring radar detectability, optimizing radar resolution and restoring non-ambiguous performance when the radar is required to operate in an electromagnetic environment that includes many simultaneous in-band and out-of-band narrow bandwidth interferences.

In particular, the present invention uses an automatic channel monitor to sample the electromagnetic environment in which the radar system is to operate. From the sampling of the environment, an electromagnetic interference (EMI) profile, which serves as a data base for calculation of the necessary bandwidth and waveforms later on, is obtained. Next, the appropriate bandwidth and the center frequency for a signal is determined. And with these pieces of information, a radar waveform is designed by means of an adaptive waveform processor, the waveform having a spectrum which contains no energy in-band with the interferences. At the same time, the processor also designs a matched filter that notches out the interferences and reduces their levels below receiver noise. The receiver is next equalized, by certain equalizer coefficients, so that when the radar pulse is received, an appropriate proper main lobe to sidelobe ratio is obtained in the compressed pulse. As a result, since there is no energy in-band with the interferences and an acceptable main lobe to sidelobe ratio is present, an optimum detection, i.e. a matched filter solution, is obtained. Thus, the present invention permits a radar system to operate in an electromagnetic environment which includes many simultaneous in-band and out-of-band narrow bandwidth interferences.

Therefore, it is an objective of the present invention to allow both radar and narrow band communications-type emitters to operate in the same frequency band.

It is another objective of the present invention to provide a radar system that has optimal resolution, non-ambiguous performance and good signal detectability.

It is yet another objective of the present invention to provide for a radar system that does not need to increase its transmitter power to restore detection range nor increase its data processing load to work around range ambiguity in target tracking.

The above-mentioned objectives and advantages of the present invention will become more apparent and the invention itself will be best understood by references to the following description of an embodiment of the invention taken in conjunction with the accompanying drawings, wherein:

BRIEF DESCRIPTION OF THE DRAWINGS

FIG. 7 is a table that demonstrates the matched filter detection performance with no interference;

FIG. 8 is a table illustrating the simulation results with interference;

FIG. 9 is a table demonstrating that matched filter detection performance can nominally be achieved in an environment with interference by using the present invention technique and apparatus.

DETAILED DESCRIPTION OF THE PRESENT INVENTION

It is well known that the spectrum of a pulse compression waveform is determined by its phase (or frequency) modulation (or code). It is further well known that the optimum detection of such a pulse is achieved using a matched filter, i.e., a filter having an amplitude response identical to the pulse's Fourier transform amplitude and with phase response conjugate to the pulse's Fourier transform phase.

It has also been well documented that any band limited signal may be represented by its sampled values taken at a rate greater than twice the bandwidth of the signal, i.e., the Nyquist rate. Furthermore, it has been well documented that the discrete Fast Fourier Transform (FFT) of blocks of those samples is a discrete (sampled) representation in the frequency domain of the pulse's true Fourier transform and that complex multiplication of the FFT and subsequent inverse discrete Fast Fourier Transformation (IFFT) under nonrestrictive conditions constitute a linear filtering, i.e., a linear convolution.

In copending application by Schreiber, et al. entitled "Narrow Band Interference Suppressor for Pulse Compression Radar", having application Ser. No. 196,578, assigned to the same assignee as the instant invention and incorporated herein by reference, it is disclosed that the relevant information carried by any received pulse compression signal is in its phase only and that the amplitude information is irrelevant. Conventional linear FM, pulse compression radar receivers are tacit acknowledgement of this because the pulse compression dispersive delay line operates on the received radar pulse to cancel its phase. The receiver amplitude tapering is conventionally invoked to control compression pulse temporal sidelobes and is independent of pulse spectrum amplitude, usually being selected from several known tapers such as Hamming, Hanning, Tschebyscheff, Taylor, etc.

Figure 1:
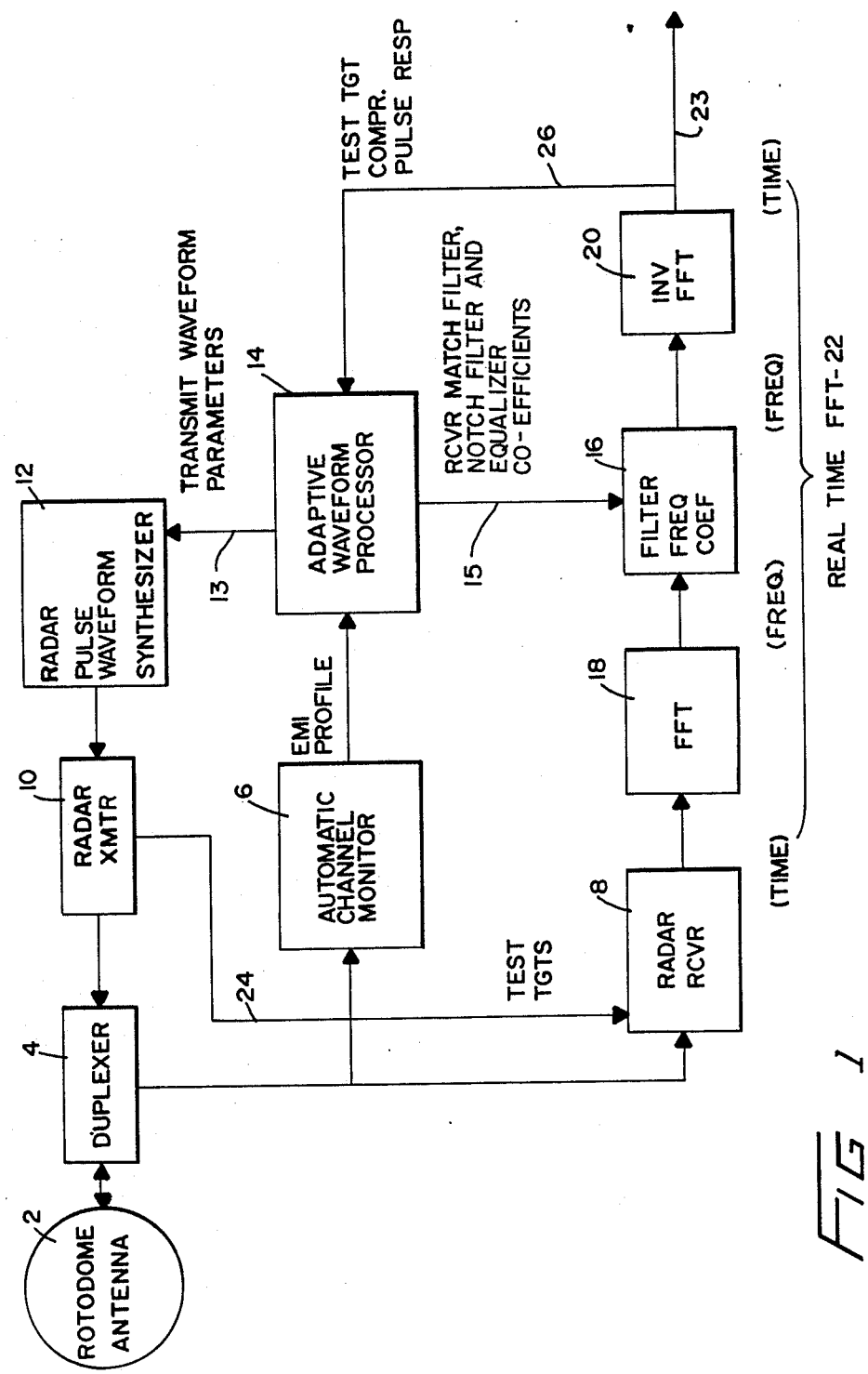
FIG. 1 is a block diagram indicating the different components needed for the present invention adaptive waveform radar system.

Referring to FIG. 1, there is shown a functional block diagram of the present invention adaptive waveform radar. As shown, the adaptive waveform radar system uses a conventional antenna such as rotodome antenna 2 connected to a duplexer 4. It should be appreciated that an antenna array may also be used. In fact, such will be discussed as a second embodiment of the invention, infra.

The output of duplexer 4 is connected to an automatic channel monitor 6 and a radar receiver 8. As is well known, pulses may both be received and sent by duplexer 4. Connected and providing input to duplexer 4 is a radar transmitter 10, which also has an output line 24 connected to radar receiver 8. The radar transmitter is connected to a radar pulse waveform synthesizer and is being fed thereby. An adaptive waveform processor 14, which receives its input data base from automatic channel monitor 6, provides the input for waveform synthesizer 12 via line 13. Processor 14 also provides an input to a filter 16 via line 15 which has as its input and output a Fast Fourier Transform circuit (FFT) 18 and an inverse Fourier transform circuit (IFFT) 20, respectively. For ease of discussion, FFT 18, filter 16 and IFFT 20 may be combined and refer to as a real time Fast Fourier Transformer (FFT) 22.

Automatic channel monitor 6, which is made by The General Electric Company, continually samples the electromagnetic environment in which the system is being operated to provide a spectral estimation thereof. The estimation is constantly updated to provide in real time the interference spectrum and the best channel for the radar system to operate in. The best channel would be that which has the widest bandwidth with the least number of interferences. The interference spectrum provides the emitter center frequency, the bandwidth and amplitude as a function of radar azimuth angle. From these pieces of information, and electromagnetic interference (EMI) data base for the system is formed.

The EMI profile is provided as an input to adaptive waveform processor 14, which is a special purpose computer employing a microprocessor and a memory, which are available from Motorola, INTEL, and Cypress Semiconductor Corporations. In essence, processor 14 is an algorithmically specialized computational system having a design reflecting the requirement of the specific algorithms for the system. It is programmable in the sense that it can solve the same algorithms for different initial conditions and coefficient sets. This programmability is a non-real time overhead function and is not a reconfiguration of the processor. And the algorithms that the processor must execute, in terms of Fast Fourier Transforms and inverse Fast Fourier Transforms, are well known and described, for example, by Bowen, et al. in "VLSI Systems Design for Digital Signal Processing", Prentice-Hall, Englewood Cliffs, New York (1982).

For the instant invention system, adaptive waveform processor 14 analyses the EMI data base (or profile) provided by monitor 6 and determines the best available channel for each azimuth sector. In other words, the center frequency, the maximum channel bandwidth for fewest in-band interferences, the interference center frequencies and the bandwidth are all determined, in view as the best available channel, by processor 14. Thereafter, using signal design techniques well known to those versed in the art and discussed in aforenoted copending application Ser. No. 196,579 by Cermignani, et al. entitled "FM Modulation Technique for Producing Frequency Rejection Bands", incorporated herein by reference, a signal is designed to match, in the "matched filter" sense, the best available channel as defined by the interferences, as measured by monitor 6.

Processor 14 also designs the matched filter (for the waveform from radar receiver 8, to be discussed more in-depth later) by supplying equalizer coefficients to filter 16 of real time FFT 22, which comprises FFT 18, filter 16 and IFFT 20, all of which have been exhaustively discussed in the aforenoted incorporated Schreiber, et al. copending application.

The above-mentioned signal designed to match the best available channel is synthesized in synthesizer 12, which is manufactured by The Hewlett Packard Company, and fed to a conventional pulse radar transmitter 10, manufactured for example by The General Electric Company. The signal may be provided to conventional duplexer 4, before being fed to a fan-beam rotodome antenna 2, manufactured for example by The Randtron Company.

The signal designed by synthesizer 12 has no energy in-band with the EMI profile. In radar transmitter 10, the power of the signal is amplified before being radiated out at some preferred direction into the environment by means of antenna 2. And when the radiated signal impinges on a target, a reflection is obtained. And by means of control circuits well known in radar systems, the transmitter is shut down by the time the signal hits the target. Accordingly, the receiver is turned on by the duplexer and the reflection of the sent signal, i.e., the echo of the target, is received through rotodome antenna 2 and directed by duplexer 4 to radar receiver 8, which is a conventional type of radar receiver. Receiver 8 includes an analog to digital converter and simply amplifies the received echo and converts the same to a complex, digital signal, i.e., in-phase and quadrature, before providing it as a complex input to FFT 18. FFT 18 takes blocks of the echo signal and converts the same to its frequency spectrum as indicated by the brackets underneath FFT 18 in FIG. 1.

Figure 10:
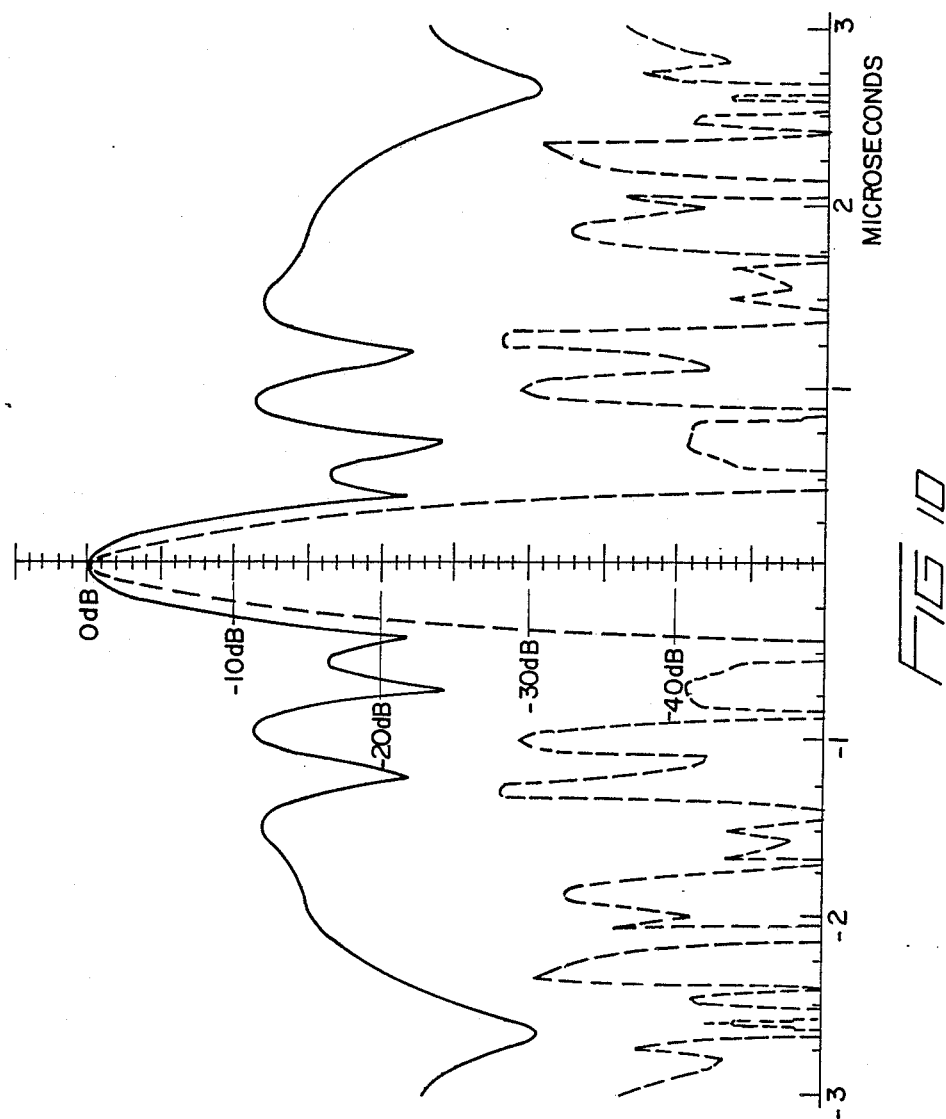
FIG. 10 is a diagram illustrating the difference between a waveform obtained as a result of the instant invention and a waveform similar to that obtained in FIG. 5.

Once the return signal has been converted to its frequency domain representation, it is then multiplied by the receiver matched filter and the equalizer coefficients in filter 16, supplied thereto by processor 14. From this multiplication, the interferences on the reflection signal are suppressed. IFFT 20 next converts the frequency spectrum back into the time domain and presents the reflection radar signal, as an uncontaminated compressed pulse, for further processing via line 23. It should be appreciated that the operation performed by real time FFT 22 involves digital signal processing, as described in the aforenoted Schreiber, et al. copending application. It should further be appreciated that the signal sent via line 23 may have a very low main lobe to sidelobe ratio, as illustrated in FIG. 10.

Figure 2:
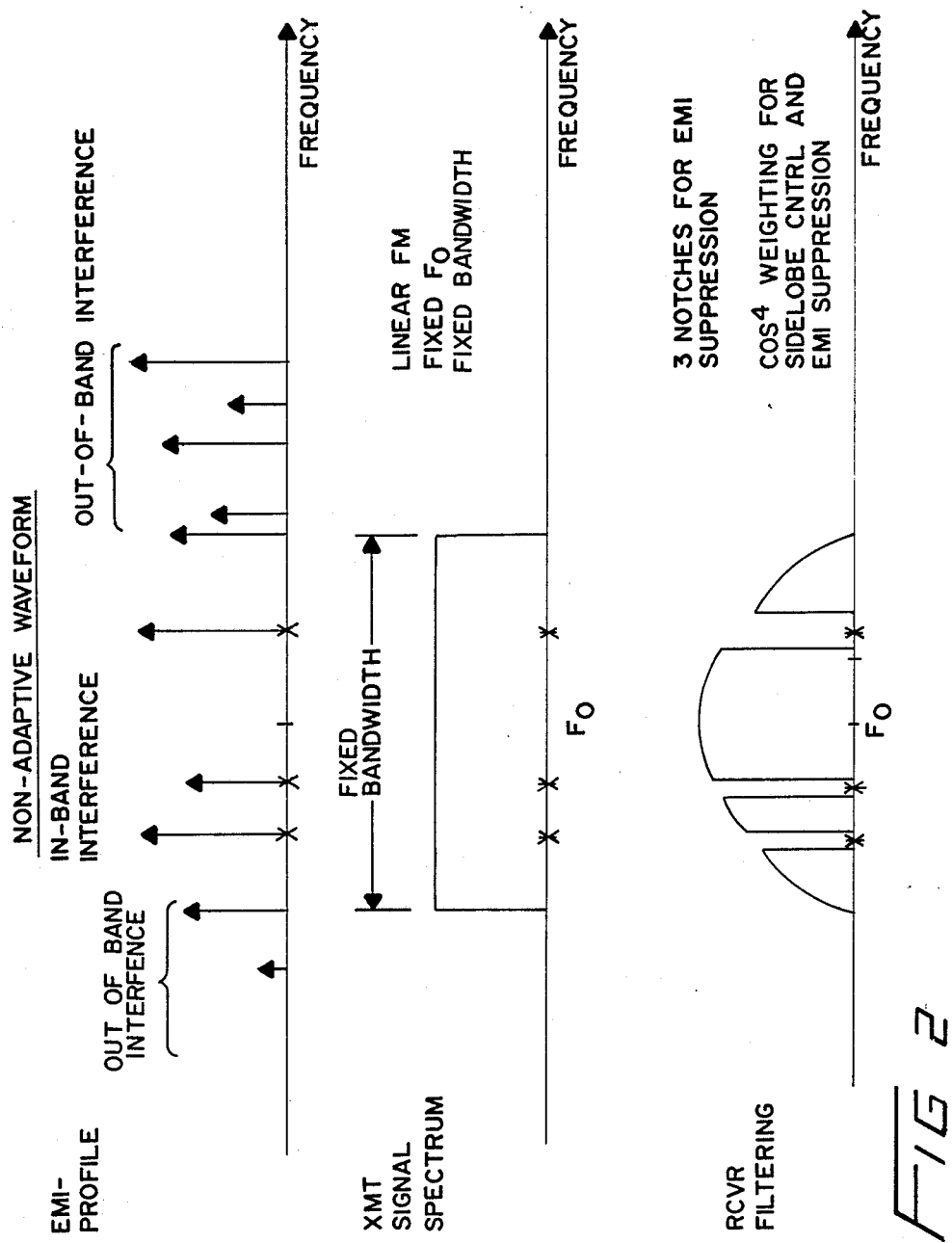
FIG. 2 shows an EMI profile, an idealized transmitter signal spectrum for a linear FM, fixed bandwidth and center frequency radar for a nonadaptive waveform.

Referring to FIG. 2, an EMI profile for a non-adaptive waveform and an idealized transmit signal spectrum for a linear FM, fixed bandwidth at center frequency radar is shown. It can be seen that within the transmit signal spectrum there are three in-band interferences The filtering provided by the receiver imposes the nominal $\cos^4$ spectral amplitude weighting for the recompressed pulse temporal sidelobe control and for the out-of-band interference suppression. Three band eliminate filters are used to suppress the in-band interferences. Thus, it should be clear to those skilled in the art of signal analysis that the receiver filter is not a matched filter for the transmit signal. Consequently, severe loss of pulse detection signal-to-noise ratio occurs.

Figure 3:
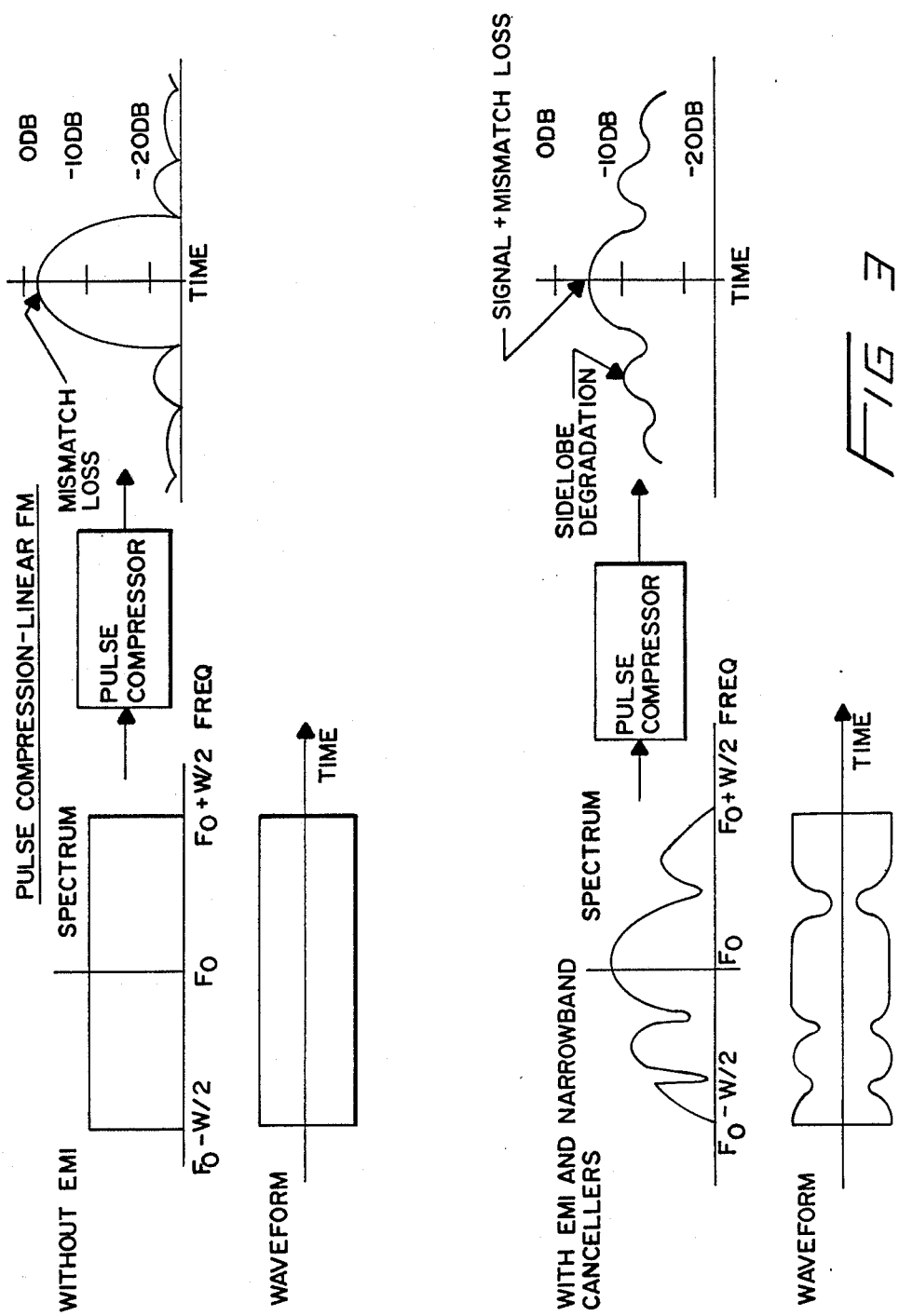
FIG. 3 illustrates the deficiencies of linear FM radar signals operating in the presence of interferences.

In addition, the three spectral holes, as indicated by the waveform at the bottom portion of FIG. 2, indicates that severe degradation of the temporal sidelobes of the recompressed pulse would occur. Such deficiency indeed is shown in FIG. 3 wherein the lower portion thereof illustrates that with an EMI profile and narrow band cancellers, the sidelobes are degraded, i.e., rises relative to the main lobe of the signal, thereby indicating a mismatch loss.

Therefore, when the EMI profile with notched spectrum is passed through a pulse compressor, such as real time FFT 22 of the instant invention (assuming no equalizer coefficients have been provided thereto), the following serious defects occur: In addition to only the mismatch loss, illustrated by the time domain signal shown in the upper portion of FIG. 3, a combination of mismatch loss and signal loss, as illustrated in the time domain signal shown in the bottom portion of FIG. 3, results. This combination mismatch and signal loss can be gleaned from the fact that the main lobe of the signal has dropped drastically while the main lobe to sidelobe ratio has degraded considerably, due to the fact that the sidelobes have risen, relative to the main lobe. In view of the degraded main lobe to sidelobe ratio, there no longer is a useful waveform produced by the pulse compressor.

Figure 4:
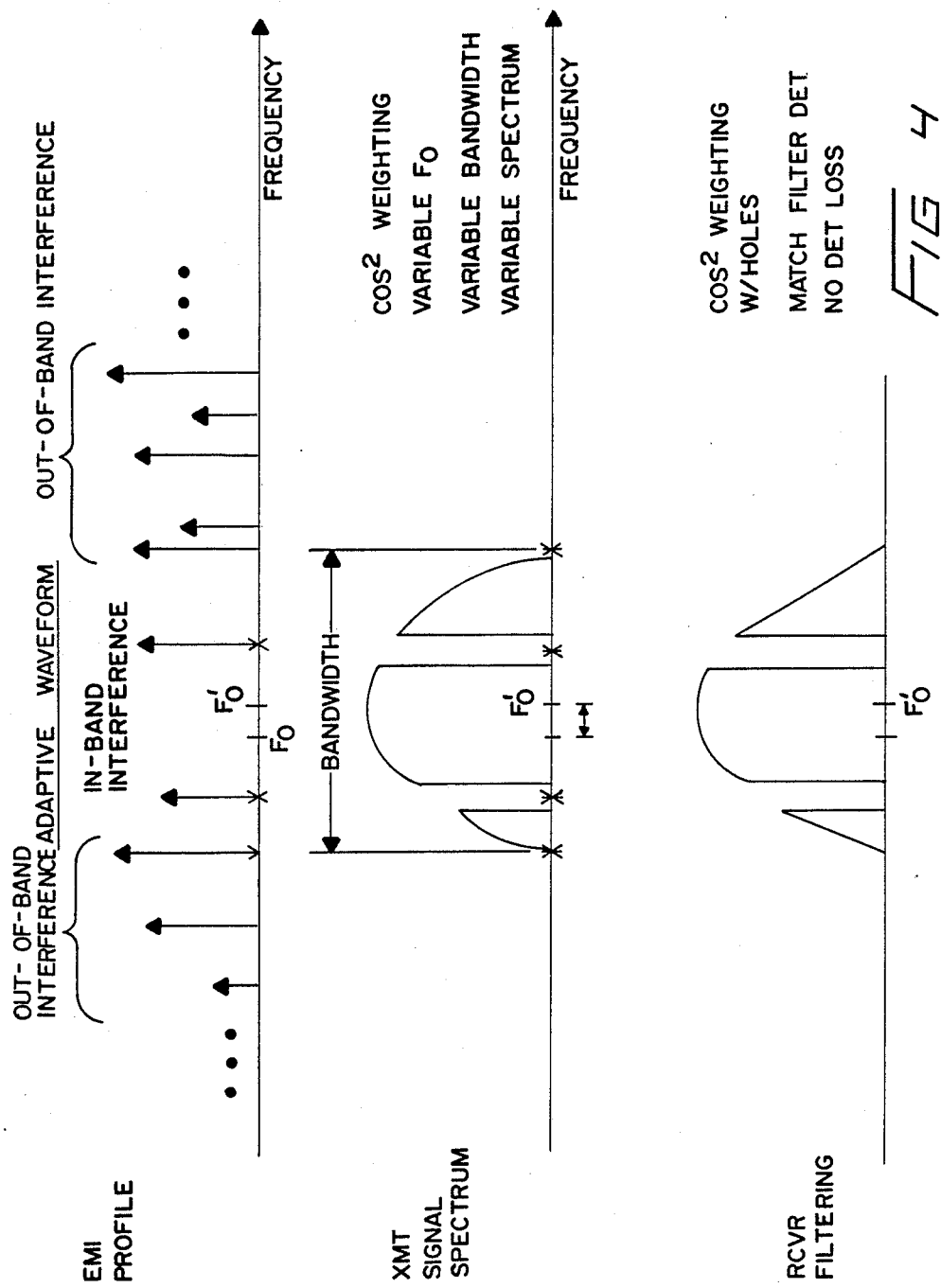
FIG. 4 illustrates the situation for an adaptive waveform operating in an EMI environment identical to that shown in FIG. 2.

FIG. 4 shows the situation for an adaptive waveform operating in an EMI environment identical to that shown in FIG. 2. Here a constant envelop pulse signal whose center frequency is digitally fine tuned to a more propitious portion of the band is synthesized from the adaptive waveform. Next, the pulse signal modulation is designed to have a nominal $\cos^2$ spectrum weighting over a narrower bandwidth than that of FIG. 2, with the result that all but two of the narrow band interferences are out-of-band, as shown by the transmit signal spectrum. In addition, allocation of signal energy is such that none appears in the band occupied by the in-band interferences. From the transmit signal spectrum and the receiver filtering waveforms, it can be seen that the signal in FIG. 4 has been designed to match the receiver filter characteristics. Accordingly, matched filter detection results, that is, matched filter performance, will be realized, thereby leading to no mismatch signal-to-noise ratio loss. However, it should be noted that the spectrum of the compressed pulse still has severe sidelobe distortion, the result of the well documented "paired echoes" in the response, as summarized and shown in FIG. 5. Indeed, with non-linear FM pulse compression signals, it has been verified by computer simulation that there is only negligible signal detection mismatch loss, with and without EMI.

Figure 5:
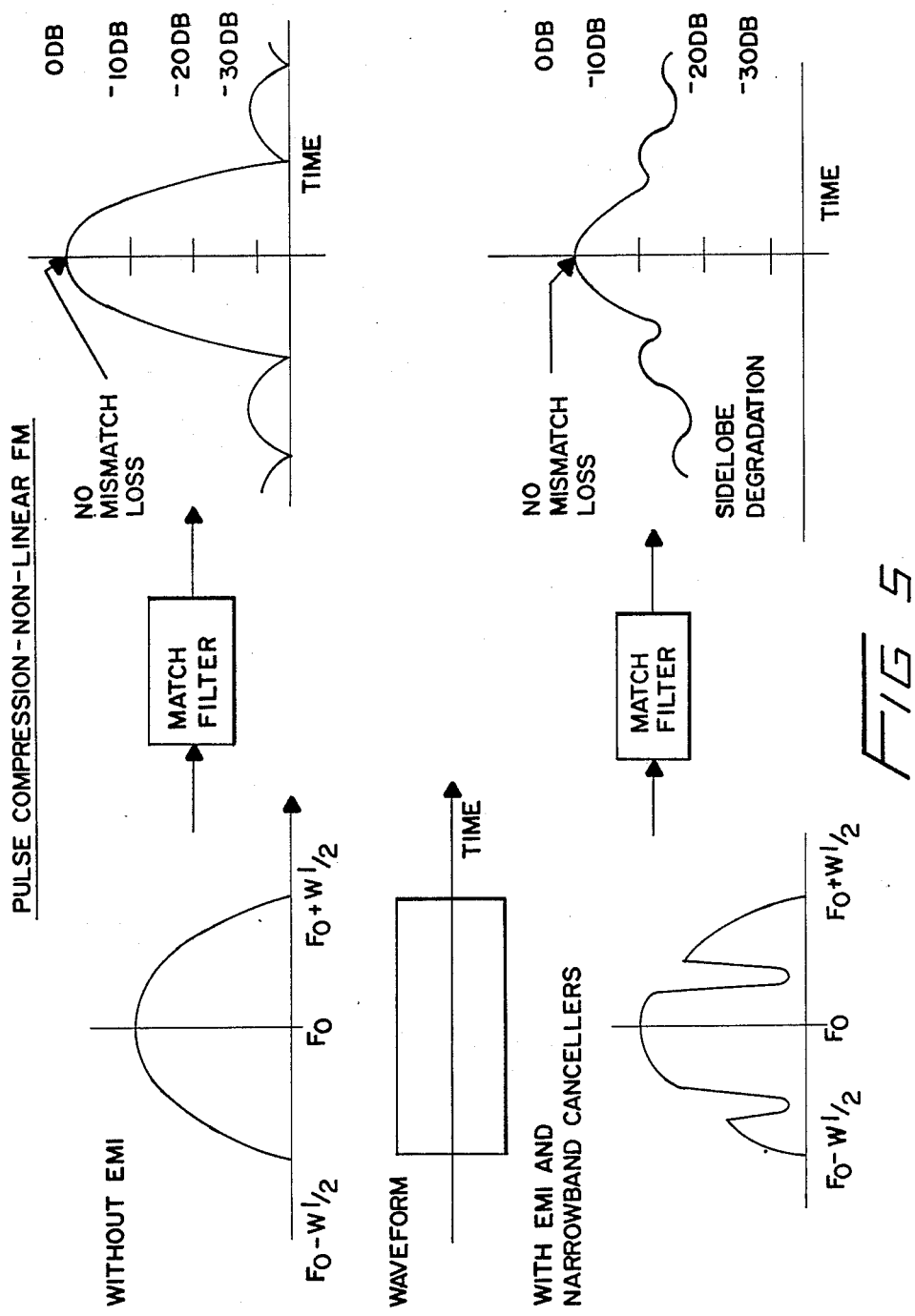
FIG. 5 shows pulse compression with the adaptive waveform, both without EMI and with EMI and narrow band cancellers.

Further looking at FIG. 5, it can be seen that when the signal and receiver have been designed to notch out the interferences in the EMI, although no signal mismatch results, there are intolerable sidelobes in the recompressed pulse, as predicted by the "paired echo" theory. As is well known, intolerable sidelobes caused by "paired echoes" can be reduced to any specified level with a transversal filter, designed to introduce paired echoes equal and opposite to those caused by the combination of transmit spectrum and receiver filtering. To achieve this end, the present invention effects a transversal filter design by placing the system in a "training mode" during which time radar receiver 8 is in its internal calibration mode.

As was discussed previously, a signal synthesized by synthesizer 12, after being amplified by transmitter 10 and routed to duplexer 4, is transmitted in some preferred direction into the environment by means of antenna 2. It should be appreciated that after the pulse has been sent out, the radar has to be stabilized and the receiver has to be turned off, since the initially received echoes reflected may be so large that the radar system cannot handle it. This period during which the radar system is turned off is often referred to as the dead time, which is the time during which the "training mode" for the present invention radar system occurs.

Referring back to FIG. 1, the target signal generated by synthesizer 12 and supplied to transmitter 10, instead of being transmitted to duplexer 4, is transmitted via line 24 to radar receiver 8 and looped around the radar system through real time FFT 22 and line 26, as a test target compression pulse response, and transmitted to adaptive waveform processor 14. Specifically, when the test signal, from synthesizer 12, is fed, after time/frequency conversion, into FFT 18, it is applied into filter 16 wherein matched filter coefficients, as calculated in adaptive waveform processor 14 for matched filter detection, has been provided. The frequency spectrum is then converted by IFFT 20 into a compressed pulse response which is fed back, via line 26, to adaptive waveform processor 14. The test target compressed pulse is used by adaptive waveform processor 14 to calculate transversal equalizer filter coefficients for reducing the temporal sidelobes of a compressed pulse. The equalizer coefficients are adaptive in that they may be adjusted by means of a "successive approximation" technique or a single matrix inversion technique, such that the desired temporal sidelobe level, relative to the main lobe of the recompressed pulse, is achieved. The transversal equalizer is realized as a simultaneous perturbation to the receiver matched filter coefficients and the transmit waveform parameters, so that simultaneous matched filter detection and low temporal sidelobes can be achieved. Although the transversal equalizer adaptation loop, as shown, uses time domain information, it should be clear to those skilled in the art that such equalizer adaptation loop can also be implemented in frequency domain.

Inasmuch as the EMI profiles could change, for example by communications channels going off the air or the airplane changing its position, thereby viewing different emitters differently, a continuous sampling of the electromagnetic environment, performed by channel monitor 6, is imperative. It is also imperative that the equalizer adaptation loop be continually performed during the dead time of the system.

It should be noted, however, that once a waveform has been designed for a particular EMI profile, it is called up as needed either through processor 14 or stored in synthesizer 12. This signal remains good only so long as the EMI profile has not been changed, i.e, the electromagnetic environment has not been changed. Once the EMI profile changes, the process is reiterated again so as to redesign a new waveform that provides for no mismatch loss and an optimal sidelobe to main lobe ratio.

Figure 6:
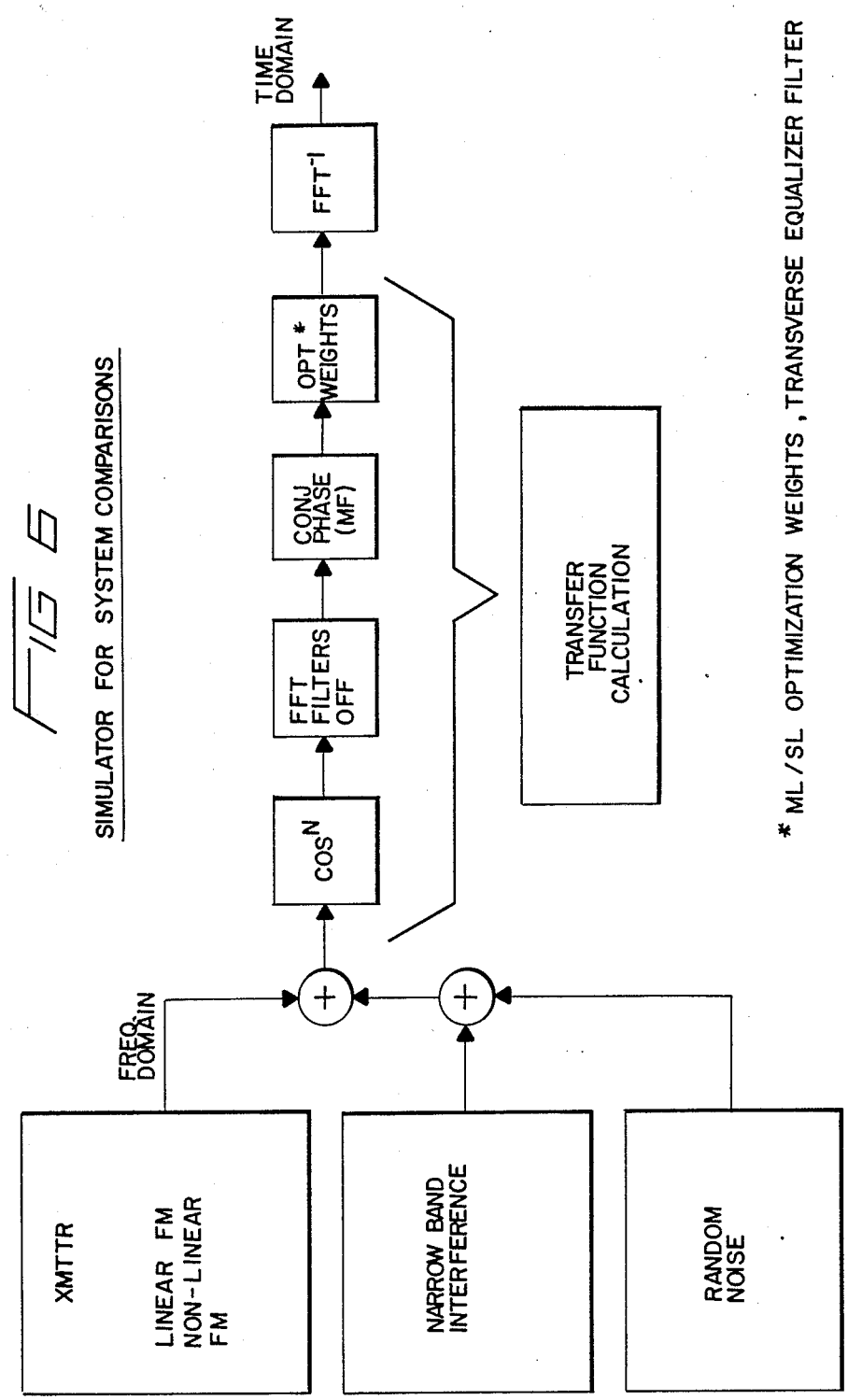
FIG. 6 is a block diagram of the real time Fast Fourier Transformer simulator used in the present invention.

FIG. 6 shows the simulator of the adaptive waveform. For the simulation model, the linear FM signal reference is a waveform chosen with a time-bandwidth product of 14 dB at a 0 dB reference level. Noise could be introduced into the model either as a random sequence of time samples at a level of 10 dB below the reference signal level, or as a mathematical power density or $N_0$ watts per Hertz; and interference could be introduced at 30 dB relative to noise.

FIG. 7 summarizes, by means of a Table 1, simulation results for the no interference case. The linear FM, matched filter receiver detection simulation results indicate a mismatch loss of 0.1 dB, compared with a theoretical 14.0 dB time-bandwidth product. Matched filter temporal sidelobes equal to the theoretical 13.6 dB are realized in the simulation. The same waveform when processed in a conventional pulse compression receiver (by conjugate phase, $\cos^2$ weighting) yields 34 dB sidelobes, with a 2.3 dB mismatch loss. For the non-linear FM (NLFM) case, with $\cos^2$ transmitted spectrum and matched filter detection, Table 1 indicates that there is a mismatch loss of only 0.2 dB. Thus, Table 1 of FIG. 7 demonstrates that matched filter detection performance can be achieved without sacrificing temporal sidelobes and resolution.

FIG. 8 illustrates a Table 2 which summarizes the results of computer simulations for those cases when interference is present. In all of the cases, except for the reference case, a nominal $\cos^2$ weighting and a conjugate phase are applied to the same received signal, namely, a linear FM pulse with time-bandwidth product of 14 dB. The "notch none" case is the reference matched filter case. For the 200 kHz bandwidth notch centered at −400 kHz from band center, it can be seen that the sidelobes degrade from 34 dB to 19 dB. For the case of one 200 kHz bandwidth notch at band center, it is seen that the sidelobes degrade from 34 dB to 12 dB. Lastly, for 200 kHz bandwidth notches located 400 kHz below and 300 kHz above band center, a mismatch loss is 3.6 dB and the sidelobes degrade from 34 to 10 dB. In all cases, there is negligible change to pulse width (See heading under PW).

FIG. 9 shows a Table 3 which demonstrates that the matched filter detection performance can nominally be achieved in the interference environment using the present invention adaptive waveform technique with notches for interference elimination as in FIG. 8, it can be seen that the simulation results have negligible mismatch loss.

By using transversal equalization as discussed previously, the sidelobes have been shown, for a particular waveform, to be reduced from 11 dB to 25 dB. The result of such a simulation is shown in FIG. 10 where the adaptive waveform was realized using a combination of pulse width modulation and frequency shift keying, yielding several holes in the transmit spectrum and compressed pulse sidelobes of nominally 11 dB. A 9 tap transversal filter reduces the sidelobes to nominally 25 dB, as shown by the dotted waveform. The waveform not having been multiplied by the transversal filter equalizer coefficients is shown by the heavy line.

Figure 11:
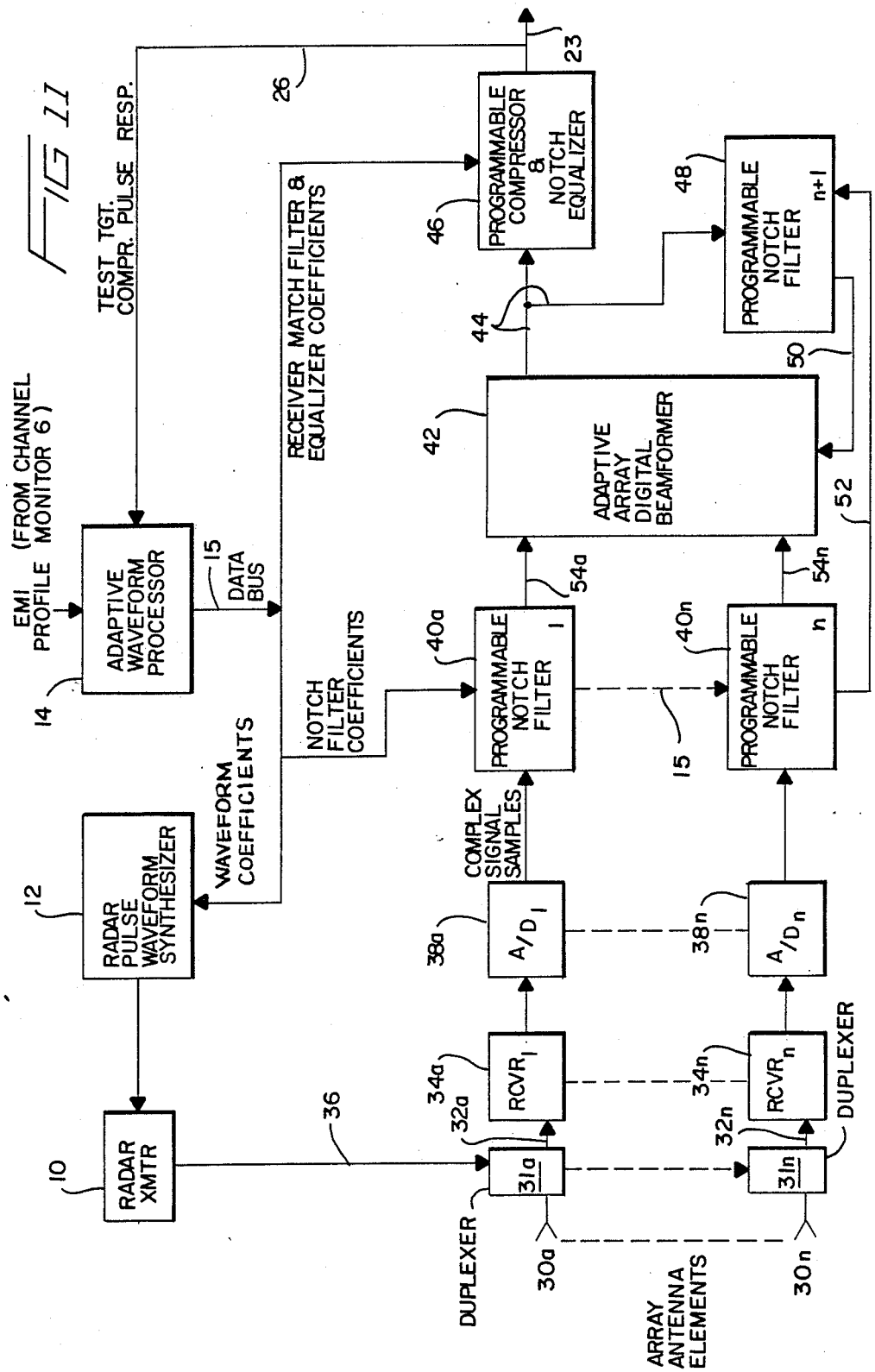
FIG. 11 is a block diagram illustrating a second embodiment of the invention which uses an antenna array instead of a corporate feed antenna.

For the present invention, as was stated earlier, instead of a corporate feed such as rotodome antenna 2, an antenna array can also be used. The use of such an antenna array is illustrated in FIG. 11, which has components, some of which are the same, and therefore labelled the same, as some of the components in FIG. 1. Also, for the sake of simplicity, only the most relevant components for an antenna array radar system is shown in FIG. 11.

In place of the corporate feed system of FIG. 1, the FIG. 11 system has a plurality of array antenna elements 1 to n, designated collectively as 30. It should be appreciated that such an array antenna is well known and is described, for example, in Mead U.S. Pat. No. 4,603,332. Similar to the FIG. 1 system, radar transmitter 10, upon receiving signals from radar pulse waveform synthesizer 12, transmits, by means of a plurality of duplexers such as duplexer 4 of FIG. 1, respective signals to the different antenna elements 30, for transmission to the environment. Reflection signals, representative of respective echoes of the target signals, are received by antenna elements 30 and fed, via duplexers 31a to 31n, by lines 32a to 32n, to a plurality of receivers 34a to 34n. Also connected to the input of the respective receivers 34a to 34n is a feed line 36 from radar transmitter 10 for transmitting test targets thereto.

Connected to the output of the respective receivers 34a to 34n are corresponding analog to digital converters 38a to 38n. It should be appreciated that the number of analog to digital converters (complex) corresponds to the number of receivers, which, in turn, corresponds to the number of antenna elements, which may be varied in accordance with the type of array antenna used. Connected to the respective outputs of (complex) analog to digital converters 38a to 38n are corresponding programmable notch filters 40a to 40n. Each of these programmable notch filters, in effect, is the same as the real time Fast Fourier Transformer 22 shown in FIG. 1. Alternatively, each of the programmable notch filters may also be made from at least one IMS A100 integrated circuit manufactured by the INMOS Corporation of Colorado Springs, Colorado. The INMOS A100 IC circuit essentially is an finite impulse response filter, i.e. a transversal filter which may be programmed to receive the complex signal samples from its corresponding inputting analog to digital converter.

The outputs of all of the programmable notch filters 40a to 40n are fed to an adaptive array digital beam-former 42, which is conventional and is discussed in Chapter 32 of the text *Referenced Data For Engineers: Radio, Electronics, Computer and Communications*, (7th edition, second printing, 1985) by Edward C. Jordan, Editor-in-Chief, published by the Howard Sams Company. Digital beam-former 42 has an output 44 one branch of which is fed to a programmable compressor and notch equalizer 46 and a second branch being fed to a programmable notch filter (N +1) 48. As shown, programmable notch filter 48 provides a feedback path 50 to digital beam-former 42 and has an input thereto from programmable notch filters 40a to 40n by means of line 52, which should be recognized as being the same as line 15. The output of programmable compressor and notch equalizer 46 is fed as a feedback response pulse to adaptive waveform processor 14 and as an output signal for further processing via line 23.

Adaptive waveform processor 14, similar to the waveform processor of the FIG. 1 embodiment, receives an EMI profile from an automatic channel monitor such as 6 in FIG. 1. From this EMI profile, adaptive waveform processor 14 is able to formulate waveform coefficients, notch filter coefficients, receiver matched filter and equalizer coefficients. The different pieces of data are then fed, by means of data bus 15, to the respective components. For example, the waveform coefficients are sent to radar pulse waveform synthesizer 12 for generating the necessary target signals to be sent to radar transmitter 10. The notch filter coefficients are fed to programmable notch filters 40a to 40n and 48, the function of which will be described in more detail during the discussion, infra, of the respective functions of the components of the FIG. 11 embodiment. The receiver matched filter and equalizer coefficients are fed to programmable compressor and notch equalizer 46.

Briefly, the FIG. 11 embodiment, but for the fact that it uses an antenna array instead of a corporate feed antenna, essentially operates in the same fashion as the FIG. 1 embodiment. The reason that the plurality of programmable notch filters 40a to 40n is positioned in front of digital beam-former 42 is due to the peculiarity of the array antenna, which, by definition, uses a plurality of antenna elements. As was mentioned previously, each of the programmable notch filter 40a to 40n corresponds to the real time Fast Fourier Transformer 22 of the FIG. 1 embodiment. Likewise, programmable notch filter 48 can be substituted by the same real time Fast Fourier Transformer 22. Ditto for the programmable compressor and notch equalizer 46. However, the functions of the different filters 40 and 48 are different from that of equalizer 46, as will be discussed later. Adaptive array digital beam-former 42 is used to suppress interference sources and automatically adjust pattern nulls in the direction of the interference sources.

The FIG. 11 embodiment operates as follows. The reflection signals received by the different antenna elements 30 are fed by lines 32a to 32n to receivers 34a to 34n, respectively. Typical of the electromagnetic environment in which the radar system operates, interference signals, which need to be suppressed in the direction of the main beam, are superposed onto the reflection signals coming into the system. From the EMI profile obtained by automatic channel monitor 6, the different spectral lines, representative of the interferences in the main beam, are determined. In the meantime, receivers 34a to 34n transmit the respective reflection signals to analog to digital converters 38a to 38n, from where corresponding digital signals, shown as complex signal samples, are fed to programmable notch filters 40a to 40n.

The respective notch filters 40a to 40n are designed, by means of the notch filter coefficients fed thereto from adaptive waveform processor 14, such that the EMI interference sources are eliminated from the reflection signals fed thereto by the respective analog to digital converters. In others words, the programmable notch filters 40a to 40n suppress the interferences such that the signals provided at their respective outputs are independent of any in-band interferences, at lines 54a to 54n. Digital beam-former 42 then automatically reviews the incoming signals and performs the following: combines the inputting signals into one beam signal and rejects the sidelobe interference of the beam signal. Thus, theoretically, at line 44, i.e. the output of digital beam-former 42, the beam signal outputted from digital beam-former 42 is interference free spatial sidelobe and main beam.

However, to guarantee that any residuals that are being operated on do not contain main beam interference, thereby inuring that digital beam-former 42 would operate only to suppress sidelobe interferences, programmable notch filter 48, having fed thereto data relating to the different residuals via line 44, provides, by feedback path 50, a main beam interference free signal to digital beam-former 42. To compensate for the sidelobe suppression, programmable compressor and notch equalizer 46, with the receiver match filter and equalizer and coefficient data fed thereto by adaptive waveform processor 14, compresses the radar received pulses as was discussed previously and performs the equalization process to compensate for the temporal sidelobes that are introduced by programmable notch filters 40a to 40n. After compression, programmable compressor and notch equalizer 42 passes the signal, as a feedback, to adaptive waveform processor 14 and as an output via line 23 to a coherent integrator (not shown) and ultimately to further processing.

In summation, per the above discussion with the FIG. 11 embodiment, it should be appreciated that it is not necessary to perform the entire filtering operation in a single real time Fast Fourier Transformer 22 and that in fact it can be done in several digital steps.

Inasmuch as the present invention is subject to many variations, modifications, and changes in detail, it is intended that all matter described throughout this specification and shown in the accompanying drawings be interpreted as illustrative only and not in a limiting sense. Accordingly, it is intended that the invention be limited only by the spirit and scope of the appended claims.

We claim:

1. A radar system for operating in an electromagnetic environment including in-band and out-of-band interferences, comprising:

means for sampling the environment to provide a spectral electromagnetic profile representative of the environment;

processor means for obtaining from the profile an optimal channel for the environment and for generating a receiver matched filter corresponding to the channel and equalizer coefficients from responsive pulses, the optimal channel having an optimum center frequency and maximum channel bandwidth with fewest in-band interferences;

means for receiving an echo of a target signal transmitted to the environment;

means for multiplying the frequency spectrum of the echo with the matched filter and for notching out the interferences in the frequency spectrum;

means for transforming the interference free frequency spectrum into a responsive pulse to be transmitted to the processor means;

wherein the processor means, using the responsive pulse, calculates transversal equalizer filter coefficients for reducing temporal sidelobes of the responsive pulse to effect an interference free signal having a desirable main lobe to sidelobe ratio.

2. The apparatus according to claim 1, wherein the sampling means comprises an automatic channel monitor that continually examines the environment for updating the spectral electromagnetic profile representative thereof.

3. The apparatus according to claim 1, wherein the multiplying means comprises a matched filter having frequency coefficients for eliminating the interferences from the frequency spectrum of the received echo.

4. The apparatus according to claim 1, wherein the transforming means comprises an inverse Fast Fourier Transformer.

5. The apparatus according to claim 1, further comprising:

a Fast Fourier Transformer for converting the echo of the target signal into its corresponding frequency spectrum.

6. The apparatus according to claim 1, wherein the processor means further generates from the profile waveform parameters to be used for generating test target signals.

7. The apparatus according to claim 6, further
means using the waveform parameters for synthesizing the test target signals;
wherein the test target signals are transmitted to the environment when the radar system is activated to transmit signals thereto and are fed to the receiving means for recursive calculations to generate an optimal main lobe to sidelobe ratio for the interference free signal.

8. In a radar system operating in an electromagnetic environment including in-band and out-of-band interferences, a method of maintaining signal detectability, optimizing resolution and restoring non-ambiguous performance for the system, comprising the steps of:

sampling the environment;

estimating from the sampled environment an electromagnetic profile including the interferences;

determining from the profile an optimal channel for the environment and channel transmit waveform parameters, the channel having an optimum center frequency and maximum channel bandwidth with fewest in-band interferences;

generating a receiver matched filter corresponding to the determined optimum channel;

transmitting a test target signal based on the waveform parameters into the environment;

receiving an echo of the target signal and converting the same into a corresponding frequency spectrum;

multiplying the frequency spectrum with the matched filter for notching out the interferences in the signal spectrum;

compressing the multiplied frequency spectrum into a responsive pulse; and utilizing the responsive pulse to calculate transversal equalizer filter coefficients for reducing temporal sidelobes of the responsive pulse to realize an uncontaminated pulse signal with a desirable main lobe to sidelobe ratio.

9. The method of claim 8, further comprising the step of:
repeating the utilizing step until an optimal main lobe to sidelobe ratio is obtained.

10. The method of claim 8, wherein the sampling step comprises the step of:
continually updating the sampling of the environment.

11. The method of claim 10, wherein the generating step comprises the steps of:
generating different matched filters in response to different electromagnetic profiles effected from environmental sample updates; and
utilizing responsive pulses from the compressing step to generate respective transversal equalizer filter coefficient.

12. A radar system for operating in an electromagnetic environment including in-band and out-of-band interferences, comprising:
means for sampling the environment to provide a spectral electromagnetic profile representative of the environment;
processor means for obtaining from the profile an optimal channel for the environment and for generating a receiver matched filter corresponding to the channel, notch filter coefficients and equalizer coefficients from responsive pulses, the optimal channel having an optimal center frequency and maximum channel bandwidth with fewest in-band interferences;
means including an antenna having an array of elements for receiving a plurality of reflected signals representing echoes of target signals transmitted by the antenna to the environment;
a plurality of filter means each for notching out the interferences in the frequency spectrum of a corresponding one of the reflection signals;
beam forming means for accepting all of the interference notched out reflection signals and for automatically combining the reflection signals to form a beam signal having pattern nulls in the direction of the interferences, the beam signal being substantially devoid of sidelobe interferences;
compressor and equalizer means for utilizing information from the receiver matched filter and the equalizer coefficients to compress the beam signal and to perform equalization to compensate for possible temporal sidelobes introduced thereto by the notch filter means;
whereby a substantially interference free signal having a desirable main lobe to sidelobe ratio is generated 13. The radar system according to claim 12, further comprising:
second filter means for receiving the main beam signal and for removing any residual interferences from the main beam signal, the second filter means further providing feedback to the beam forming means to insure the removal of the residual interferences.

14. The radar system according to claim 12, wherein the sampling means comprises an automatic channel monitor that continually examines the environment for updating the spectral electromagnetic profile representative thereof.

15. The radar system according to claim 12, wherein each of the notch filter means comprises:
a Fast Fourier Transformer for converting the reflection signal to its corresponding frequency spectrum;
a filter connected to the output of the Fast Fourier Transformer and being supplied by the processor means with data relating to the notch filter means for correlating the notch filter mean data with the corresponding frequency spectrum; and
an inverse Fast Fourier Transformer connected to the output of the filter for inverse transforming the correlated frequency spectrum to a corresponding time domain signal.

16. The radar system according to claim 12, wherein the compressor and equalizer means comprises:
a Fast Fourier Transformer for converting the beam signal from the beam forming means to its corresponding frequency spectrum;
a filter connected to the output of the Fast Fourier Transformer and being supplied by the processor means with data relating to the receiver matched filter and equalizer coefficients for correlating the data with the corresponding frequency spectrum; and
an inverse Fast Fourier Transformer connected to the output of the filter for inverse transforming the correlated frequency spectrum to a corresponding time domain signal.

17. The radar system according to claim 12, wherein each of the notch filter means comprises:
at least one IMS A100 type, programmable transversal filter integrated circuit.

18. In a radar system operating in an electromagnetic environment including in-band and out-of-band interferences, a method of maintaining signal detectability, optimizing resolution and restoring non-ambiguous performance for the system, comprising the steps of:
sampling the environment;
estimating from the sampled environment an electromagnetic profile including the interferences;
determining from the profile an optimal channel for the environment and channel transmit waveform parameters, the channel having an optimum center frequency and maximum channel bandwidth with fewest in-band interferences;
generating a receiver matched filter corresponding to the determined optimum channel, notch filter and equalizer coefficients;
transmitting a plurality of target signals based on the waveform parameters to the environment;
utilizing an array antenna to receive a plurality of reflection signals representative of echoes of the target signals, each array of the antenna receiving one of the reflection signals and any interference superposed thereon;
suppressing the interference in each of the reflection signals and converting the reflection signals into corresponding frequency spectrums;
combining the corresponding frequency spectrums to form a beam signal having pattern nulls in the direction of interferences and substantially eliminating sidelobe interferences from the beam signal;
utilizing data relating to the receiver matched filter and the equalizer coefficients to compress and to equalize the beam signal for compensating possible temporal sidelobe interference introduced thereto during the suppressing step;

thereby generating a substantially interference free signal having a desireable main lobe to sidelobe ratio.

19. The method according to claim 18, wherein the combining and eliminating step comprises the step of: utilizing an adaptive array digital beam-former for receiving the interference suppressed reflection signals and for outputting the beam signal.

20. The method according to claim 19, further comprising the step of:

feedbacking data to the digital beam-former to ensure that no interference exists in the main beam and that the beam-former suppresses only the sidelobe interferences.

* * * * *

UNITED STATES PATENT AND TRADEMARK OFFICE
CERTIFICATE OF CORRECTION

PATENT NO. : 4,901,082
DATED : February 13, 1990
INVENTOR(S) : Heinz H. Schreiber, et al.

It is certified that error appears in the above-identified patent and that said Letters Patent is hereby corrected as shown below:

```
Column 2, line 34, after "their" insert --time--.

Column 4, line 59, change "refer" to --referred--.

Column 6, line 66, change "envelop" to --envelope--.

Column 8, line 37, change "or" to --of--.

Column 9, line 65, change "an" to --a--.

Column 10, line 46, change "filter" to --filters--.

Column 11, line 24, change "inuring" to --insuring--.

Column 11, line 56, change "sysfem" to --system--.

Column 12, line 35, after "further" insert --comprising:--.

Column 15, line 4, change "desireable" to --desirable--.
```

Signed and Sealed this

Twenty-sixth Day of February, 1991

Attest:

HARRY F. MANBECK, JR.

*Attesting Officer*  *Commissioner of Patents and Trademarks*